April 19, 1949. A. C. WEIBY 2,467,512
MILKING APPARATUS
Filed Dec. 15, 1945 2 Sheets-Sheet 2
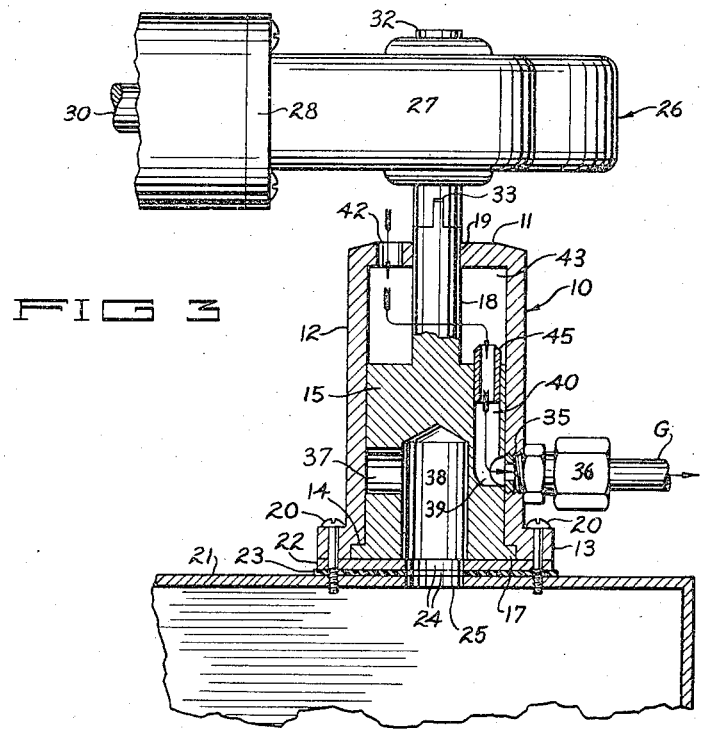
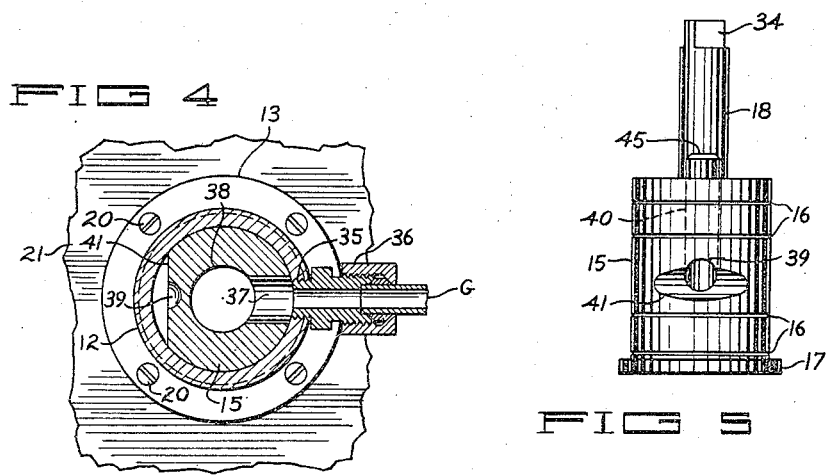
Inventor
ALFRED C. WEIBY
By Carlsen & Hazle
Attorneys Patented Apr. 19, 1949

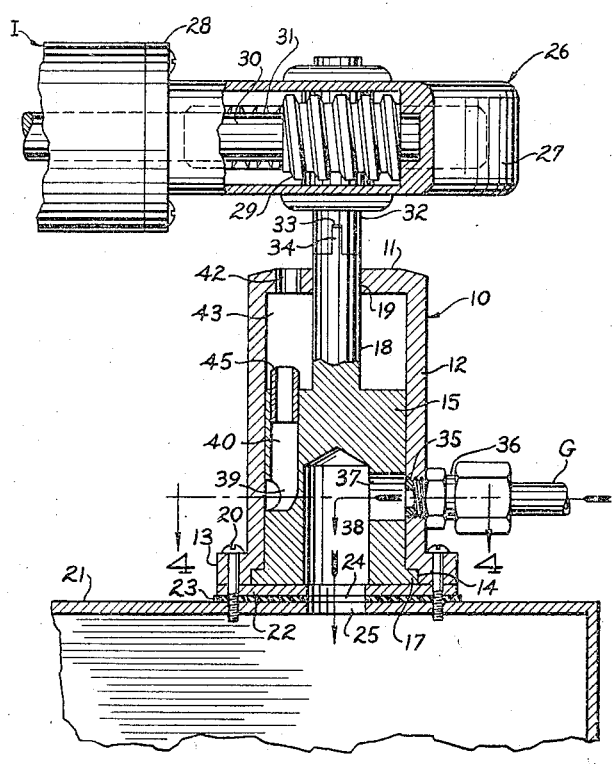
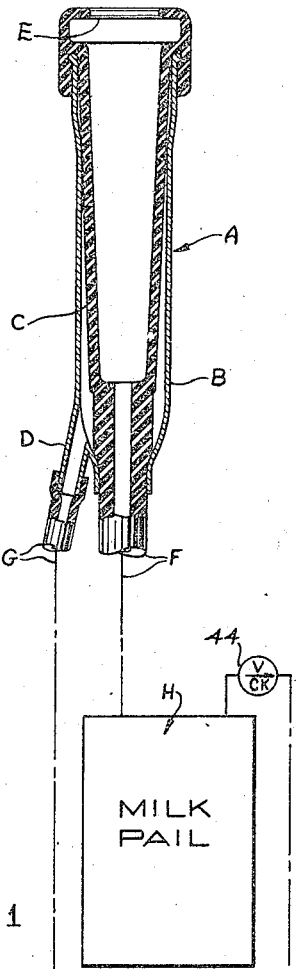
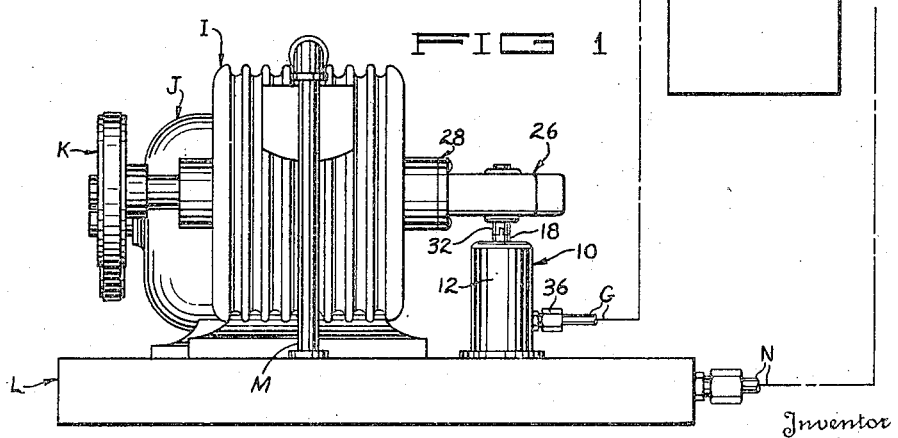

2,467,512

UNITED STATES PATENT OFFICE 2,467,512

MILKING APPARATUS

Alfred C. Weiby, Minneapolis, Minn., assignor to Solar Corporation, Milwaukee, Wis.

Application December 15, 1945, Serial No. 635,246

2 Claims. (Cl. 31—62)

This invention relates generally to improvements in milking apparatus and more particularly to an improved pulsator mechanism and pulsing assembly for such machines for daily use and the like.

The primary object of my invention is to provide a pulsator, or device for intermittently and periodically connecting the teat cups to a suction source or vacuum, which is very simple and positive in construction and operation; and which is operated mechanically, instead of by vacuum as are all other pulsators with which I am familiar, and is, therefore, more dependable and effective in operation as will appear hereinafter. Another and important object is to provide a pulsator construction and suction arrangement such that a loss of vacuum will not be likely to occur.

These and other objects and advantages of my invention will be pointed out in the course of the following specification, in which reference is had to the accompanying drawings, wherein:

Fig. 1 is a view, partially in elevation, in section and in diagrammatical form, showing my improved pulsator and connections to vacuum pump, milk pail and one teat cup.

Fig. 2 is an enlarged vertical cross sectional view through the pulsator, vacuum tank and pulsator drive, the pulsator rotor being shown in position for supplying suction or vacuum to the teat cup.

Fig. 3 is a similar view but showing the pulsator rotor in position for admitting ambient air pressure to the teat cup.

Fig. 4 is a horizontal cross sectional view along the line 4—4 in Fig. 2.

Fig. 5 is a side elevation of the pulsator rotor removed from its casing or housing.

Referring now more particularly and by reference characters to the drawing, my present invention is shown for purposes of exemplification herein as used in connection with a teat cup A of the "double-chambered" type, including an outer cup shell B and an inner flexible and elastic teat receiving liner, or "inflation" as it is commonly called and as it will be referred to hereinafter. The shell B has a nipple D and the inflation C is fitted at the top and bottom of the shell in such manner that an air tight chamber is formed around the inflation, communicating with said nipple D. The inflation C has the usual teat receiving orifice E at its top and is formed at its bottom with a hose F which, together with a hose G fitting nipple D, forms the lines connecting the teat cup with the remainder of the milking machine.

As is well known in the art, this form of teat cup operates with a constant vacuum, suction or negative pressure within the inflation C, while the chamber surrounding the inflation is alternately connected to the vacuum or suction source and to air of positive pressure or atmospheric pressure. When vacuum exists in the chamber the inflation stands normally as shown whereas, when air is admitted to the chamber, its pressure, opposed only by the resiliency of the inflation, squeezes it inward with a gentle massaging action upon the teat. Milk is drawn from the teat between each massaging cycle through the milk line or hose F, and this hose leads to a milk pail H, shown only in diagrammatical form herein.

Suction is provided for the milking operation by a vacuum pump I of any convention form, operated by an electric motor or other prime mover J through a belt and pulley mechanism K. The pump I exhausts the air from a tank L through a pipe connection M and may be arranged to maintain any selected vacuum, in inches of mercury, in the tank. A vacuum line N connects the tank L to the milk pail H to maintain the same vacuum therein.

In accordance with my present invention I provide a pulsator or pulsatory valve device 10 for alternately connecting the pulsing hose or line G to the vacuum tank L and to atmosphere, as will now be described. This pulsator comprises a casing or housing having an upper end 11 and a cylindrical body or wall 12 open at its lower end and provided therearound with an outwardly extending peripheral base flange 13. Also provided around the inside of this open lower end of the housing is an annular groove 14.

Rotatably mounted in the housing is a pulsator or valve rotor or member 15 which is of a diameter such as to closely fit the internal diameter of the cylindrical wall 12. This rotor 15 has peripheral oil grooves 16 and a diametrically enlarged flange 17 at its lower end adapted to fit and run in the groove 14. The rotor further has an upwardly extending and centrally positioned drive stem or shank 18 which is journaled upwardly through a bearing opening 19 formed in the top 11 of the pulsator housing.

The housing is mounted atop the tank L adjacent one end of the pump I and for this mounting the base flange 13 is apertured to pass screws 20 which are threaded down into the top 21 of the tank. Interposed between the base of the housing and the tank I may use a base plate 22 and gasket 23, and both of these elements have central openings 24 which register with an opening 25 in the tank top 21, thus placing the interior of the housing in communication with the interior of the tank. When so mounted the rotor drive stem 18 projects upwardly and the stem is driven by means of a worm gear speed reducer element 26 driven from the pump I. This unit may be of any suitable and conventional form, and is here shown as comprising a housing 27 secured by a flanged end 28 to the end of the pump and having a worm 29 driven by an extension of the pump shaft 30. The worm 29 meshes with and drives a worm gear 31 the shaft 32 of which extends downwardly to the upper end of the rotor stem. Said shaft 32 may be diametrically slotted at 33 to receive a key 34 formed on the upper end of the rotor stem 18 and the arrangement is obviously such that the pulsator rotor 15 will be driven at a speed proportional to, but much less than the speed at which the pump operates.

The pulsator housing has a tapped opening 35 in one side and in this opening is fitted any suitable form of coupling 36 by which the pulsing line or hose G is placed in communication with the interior of the housing. At the same level the rotor 15 has a radially extending vacuum or suction port 37 which is adapted at its outer end, where it opens through the peripheral surface of the rotor, to communicate with opening 35. The inner end of the port 37 enters an axially and centrally extending suction chamber or recess 38 which opens through the bottom of the rotor in communication with the openings 24 and 25 leading to the interior of the tank L. It will be noted that the rotor 15 is held by its flange 17 in tight, running engagement with the base plate 22 so that no leakage will result at the lower end of the assembly.

Substantially opposite the suction port 37, and at the same level, the pulsator rotor 15 further has an air pressure port 39 opening through its peripheral surface and communicating with a passage or duct 40 leading upwardly and opening through the top of the rotor. Actually the port 39 opens into a tangentially extending groove 41 (Figs. 4 and 5) the purpose of which will presently appear. The top 11 of the pulsator housing has an opening 42 which admits air at atmospheric pressure to the upper end of the housing and it will be noted that the rotor 15 is shorter than the wall 12 so that a substantial air chamber 43 is present above the rotor.

In operation, the pulsator rotor 15 as it turns will first, in the position illustrated in Fig. 2, connect the pulsing line G with the interior of the tank L. That is, each time the port 37 traverses the opening 35 the line G will communicate for an interval with the tank through said port and opening, the recess 38 and the openings 24 and 25. This, then, provides the milking cycle in the teat cup A by evacuating the air from about the inflation C. As the rotor reaches the position of Fig. 3 the line G will be connected for another interval to atmosphere through the opening 35, port 39, duct 40 and chamber 43 and the teat cup will go through its massaging operation. Between these two positions the rotor 15 will, of course, seal off the line G and the relative sizes of the ports, with respect to the orifice leading to line G along with the speed at which the rotor rotates will determine the magnitude and frequency of the milking and massaging operations. The groove 41 so regulates and extends the time during which the air is admitted to the line G that the chamber about the inflation C may completely but relatively slowly fill and provide the most beneficial massaging effect upon the teat.

Attention is called in Fig. 1 to the provision in the vacuum line N between the pail H and tank L of a check valve indicated at 44. This valve is so arranged that air may be drawn from the pail H by the pump I to provide the necessary vacuum in the pail for drawing milk from the inflation C and maintaining a suction therewithin. However air cannot enter the pail H past the check valve. This is important for the reason that any failure, or leakage, which may develop in the pulsing line G, tank L, pump I or other connected part will not cause the vacuum to be lost within the pail H since air cannot flow past the check valve. Thus under all conditions, with the teat cup on the cow, vacuum will be maintained in the inflation C from the pail H, and the teat cup will not fall off the teat and become dirty or require replacement. As another example, should a power or motor failure cause the pump to stop, leaving air pressure in the pulsing line G due to the position of the pulsator rotor, the vacuum still present in the pail and inflation would continue to hold the teat cup in place for some time, or until the machine could be again set in operation.

It will be apparent that my pulsator being purely mechanical, and mechanically driven from the pump is unaffected by variations in vacuum, as in the vacuum operated pulsators of my knowledge, and being located at the pump, the pulsator is out of the way where it will not be damaged, and is further in such position in the system that it may control milking cups for a number of cows.

Oil for lubricating and sealing about the pulsator rotor 15 may be introduced through the opening 42 in the top and it will be noted that I provide the duct 40 with a nipple 45 which extends some distance above the top surface of the rotor. Thus the oil will be prevented from flowing directly down into the duct 40 and so entering the milking system and a small quantity of oil may be maintained above the rotor so long as it remains below the level of the top of said nipple.

The frequency of the pulsations, when my pulsator is used, is determined by the speed of the pump I and effective reduction ratio of the reducer 26 driving the rotor 15. Thus the frequency may be initially determined and set at a rate known to be best for the purpose and cannot then be misadjusted by the operator to a rate which is harmful to the cow, as so frequently happens with the common vacuum operated pulsators. This, in fact, has been one great disadvantage of pulsators now in use, it being understood that the operators have a tendency to adjust for more rapid pulsations to maintain milking rate as the machine and particularly the pulsator wears or becomes dirty or sluggish in operation.

It will also be apparent that the relative positions of the ports 37 and 39, as well as the sizes thereof, will control the time of the massaging and milking cycles relative to each other. It will be apparent therefore that my pulsator permits the initial selection and maintenance thereafter of controlled pulsations of any desired frequency and time intervals.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A pulsator for a milking apparatus having a suction source, and a pulsing line adapted to be intermittently connected to said source, comprising in combination, an upright cylindrical housing having connections to the suction source and pulsing line, a rotor journaled in the housing for rotation therein, the said rotor having openings operative to periodically connect the pulsing line and suction source, the said housing having an opening in its upper end leading to atmosphere and the rotor having an opening in its upper end adapted to be periodically connected to said pulsing line to admit air thereto, the said opening in the housing serving also as an oil hole for admission of lubricating oil atop the rotor, and a nipple in the opening in the top of the rotor and extending above the level thereof to exclude oil from the opening.

2. A pulsator for a milking apparatus having a suction source, and a pulsing line adapted to be intermittently connected to said source, comprising in combination, an upright cylindrical housing having connections to the suction source and pulsing line, a rotor journaled in the housing for rotation therein, the said rotor having an opening operative to periodically connect the pulsing line and suction source, the said housing having an opening in its upper end leading to atmosphere and the rotor also having an opening in its upper end adapted to be periodically connected to said pulsing line to admit air thereto, the said opening in the housing serving also as an oil hole for admission of lubricating oil atop the rotor, and means rising around the opening in the top of the rotor to exclude oil from said opening.

ALFRED C. WEIBY.

REFERENCES CITED

The following references are of record in the file of this patent:

UNITED STATES PATENTS

| Number | Name | Date |
| --- | --- | --- |
| 891,506 | Sprague | June 23, 1908 |
| 1,276,184 | Daysh | Aug. 20, 1918 |
| 1,410,286 | Dinesen | Mar. 21, 1922 |
| 1,472,467 | Gessler | Oct. 30, 1923 |
| 1,949,875 | Persoons et al. | Mar. 6, 1934 |

FOREIGN PATENTS

| Number | Country | Date |
| --- | --- | --- |
| 27,982/30 | Australia | Sept. 1, 1930 |
| 5356/31 | Australia | Dec. 12, 1931 |